US010951415B2

(12) United States Patent
Velikevitch et al.

(10) Patent No.: US 10,951,415 B2
(45) Date of Patent: Mar. 16, 2021

(54) SYSTEM, METHOD, AND COMPUTER PROGRAM PRODUCT FOR IMPLEMENTING ZERO ROUND TRIP SECURE COMMUNICATIONS BASED ON NOISY SECRETS WITH A POLYNOMIAL SECRET SHARING SCHEME

(71) Applicant: Dark Matter L.L.C., Dubai (AE)

(72) Inventors: Serguei Velikevitch, Richmond Hill (CA); Alexander Sherkin, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 195 days.

(21) Appl. No.: 16/352,546

(22) Filed: Mar. 13, 2019

(65) Prior Publication Data
US 2020/0295946 A1 Sep. 17, 2020

(51) Int. Cl.
*H04L 9/32* (2006.01)
*H04L 9/08* (2006.01)
*H04L 9/30* (2006.01)

(52) U.S. Cl.
CPC ............ *H04L 9/3242* (2013.01); *H04L 9/088* (2013.01); *H04L 9/0822* (2013.01); *H04L 9/3026* (2013.01)

(58) Field of Classification Search
CPC ..... H04L 9/3242; H04L 9/0822; H04L 9/088; H04L 9/3206; H04L 9/085; H04L 9/0869
See application file for complete search history.

(56) References Cited

U.S. PATENT DOCUMENTS

| 4,168,396 | A  | * | 9/1979  | Best ..................... | G06F 12/1408 713/190 |
| 6,055,508 | A  | * | 4/2000  | Naor .................. | G06Q 10/0639 705/7.38 |
| 6,658,569 | B1 | * | 12/2003 | Patarin .................... | G06F 7/723 713/194 |
| 7,657,033 | B2 | * | 2/2010  | Fiske .................... | H04L 9/0631 380/259 |
| 8,345,861 | B2 | * | 1/2013  | Schneider ............... | H04L 9/085 380/28 |
| 8,677,123 | B1 | * | 3/2014  | McGregor, Jr. ........... | H04L 9/00 713/168 |

(Continued)

OTHER PUBLICATIONS

Shamir, "How to share a secret," Commun. ACM 22 (11), pp. 612-613, 1979.

*Primary Examiner* — Shahriar Zarrineh
(74) *Attorney, Agent, or Firm* — Zilka-Kotab, P.C.

(57) ABSTRACT

Zero round trip secure communications is implemented based on noisy secrets with a polynomial secret sharing scheme. A sender identifies two negotiated noisy secrets associated with an encrypted message to send to a receiver system. The sender utilizes a first negotiated noisy secret for sub-key selection, and generates a secret polynomial using Shamir's polynomial-based secret sharing scheme with N positive integer points and a message key as a secret. The sender divides the first negotiated noisy secret into a plurality of sub-keys, and divides a second negotiated noisy secret into test blocks of a length equivalent to a length of a sub-key. The sender utilizes each of the plurality sub-keys for encrypting a corresponding test block along with one unique point of the secret polynomial. Moreover, the sender sends all encrypted test blocks and corresponding encrypted points of the secret polynomial to the receiver with the encrypted message.

14 Claims, 9 Drawing Sheets

(56) References Cited

U.S. PATENT DOCUMENTS

| | | | |
|---|---|---|---|
| 9,191,200 B1* | 11/2015 | Adams | G06F 21/60 |
| 9,331,984 B2* | 5/2016 | Matsuo | H04L 63/0428 |
| 9,690,949 B1* | 6/2017 | Diorio | H04L 9/321 |
| 9,819,657 B2* | 11/2017 | Tasher | H04L 9/0662 |
| 10,348,491 B2* | 7/2019 | Ikarashi | H04L 9/085 |
| 10,411,886 B1* | 9/2019 | Vermeulen | H04L 63/061 |
| 10,601,585 B1* | 3/2020 | Robinson | H04L 9/0894 |
| 2004/0019785 A1* | 1/2004 | Hawkes | H04L 9/3242 713/168 |
| 2004/0255133 A1* | 12/2004 | Lei | G06F 21/6227 713/193 |
| 2007/0286416 A1* | 12/2007 | Bertoni | H04L 9/3242 380/37 |
| 2009/0136024 A1* | 5/2009 | Schneider | H04L 9/085 380/28 |
| 2010/0211787 A1* | 8/2010 | Bukshpun | H04L 9/065 713/170 |
| 2013/0010953 A1* | 1/2013 | Seurin | H04L 9/085 380/255 |
| 2014/0095892 A1* | 4/2014 | Lai | G06F 21/78 713/190 |
| 2014/0189348 A1* | 7/2014 | El-Shimi | G06F 21/6218 713/165 |
| 2015/0270968 A1* | 9/2015 | Nairn | H04L 9/3242 713/181 |
| 2016/0154966 A1* | 6/2016 | Fiske | H04L 63/0428 726/26 |
| 2017/0118016 A1* | 4/2017 | Shibutani | H04L 9/0861 |
| 2017/0155510 A1* | 6/2017 | Cloostermans | H04L 9/3093 |
| 2017/0170961 A1* | 6/2017 | Androulaki | G06F 12/1408 |
| 2017/0359843 A1* | 12/2017 | Bell | H04W 12/0602 |
| 2019/0087594 A1* | 3/2019 | Nix | H04L 9/006 |
| 2019/0349192 A1* | 11/2019 | Tolhuizen | H04L 9/0819 |
| 2020/0195427 A1* | 6/2020 | Beck | H04L 9/0866 |
| 2020/0213099 A1* | 7/2020 | Wright | H04L 9/088 |
| 2020/0313845 A1* | 10/2020 | Rioul | H04L 9/002 |

\* cited by examiner

SYSTEM, METHOD, AND COMPUTER PROGRAM PRODUCT FOR IMPLEMENTING ZERO ROUND TRIP SECURE COMMUNICATIONS BASED ON NOISY SECRETS WITH A POLYNOMIAL SECRET SHARING SCHEME

FIELD OF THE INVENTION

The present invention relates to implementing secure communications, and more particularly to implementing zero round trip secure communications based on noisy secrets with a polynomial secret sharing scheme.

BACKGROUND

Secure communication based on a negotiated secret assumes that the secret is exactly the same for both the sender and the receiver. The secret allows both parties to derive the same key and use it to encrypt and decrypt messages. In the case when the negotiated secret is noisy, a reliable negotiation of the same key becomes a problem.

Having a noisy secret means that sender's version and the receiver's version of the negotiated secret have the same size but differ in a small number of bits. These bits are considered noisy bits. A noiseless sub-key has no noisy bits selected from the negotiated noisy secret. Message loss means that message cannot be decrypted on the receiver side because of a noisy key. Current systems fail to effectively address issues associated with negotiated noisy secrets.

There is thus a need for addressing these and/or other issues associated with the prior art.

SUMMARY

A system, method, and computer program product are provided for implementing zero round trip secure communications based on noisy secrets with a polynomial secret sharing scheme. In operation, a sender system identifies (e.g. negotiates, etc.) two negotiated noisy secrets associated with an encrypted message to send to a receiver system. The sender system utilizes a first negotiated noisy secret for sub-key selection. The sender system generates a secret polynomial using Shamir's polynomial-based secret sharing scheme with N points, where N is a positive integer, and a message key as a secret. The sender system divides the first negotiated noisy secret into a plurality of sub-keys. The sender system divides a second negotiated noisy secret into test blocks of a length equivalent to a length of a sub-key. The sender system utilizes each of the plurality sub-keys for encrypting a corresponding test block along with one unique point of the secret polynomial. Moreover, the sender system sends all encrypted test blocks and corresponding encrypted points of the secret polynomial to the receiver system with the encrypted message.

DETAILED DESCRIPTION

Figure 1:
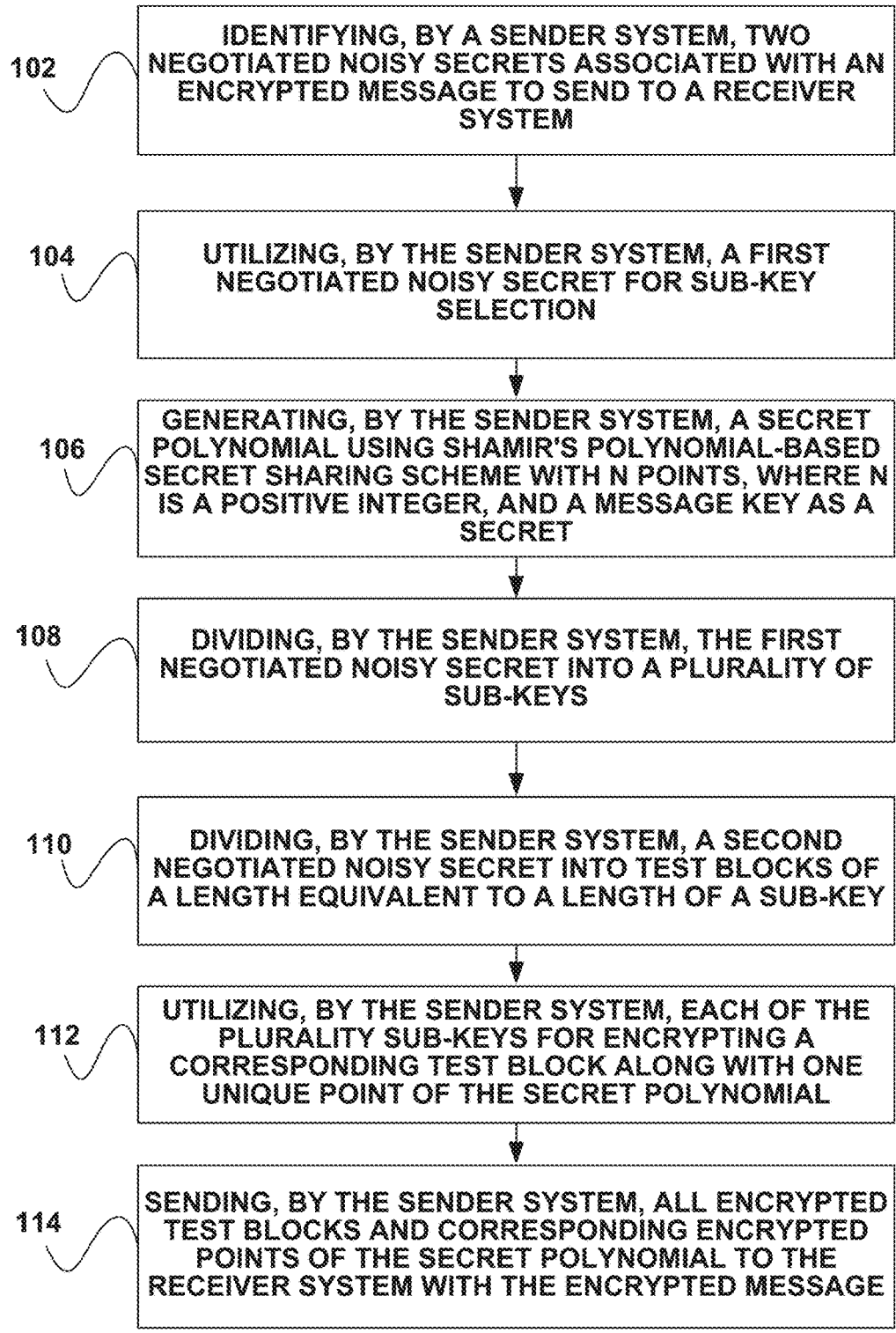
FIG. 1 shows a method for implementing zero round trip secure communications based on noisy secrets with a polynomial secret sharing scheme, in accordance with one embodiment.

FIG. 1 shows a method 100 for implementing zero round trip secure communications based on noisy secrets with a polynomial secret sharing scheme, in accordance with one embodiment.

In operation, a sender system identifies (e.g. negotiates, etc.) two negotiated noisy secrets associated with an encrypted message to send to a receiver system. See operation 102. The sender system and/or the receiver system may include any device capable of sending messages, such as a computer (e.g. tablet, laptop, desktop, etc.), a mobile phone, a gaming device, etc. The sender system utilizes a first negotiated noisy secret for sub-key selection. See operation 104.

The sender system generates a secret polynomial using Shamir's polynomial-based secret sharing scheme with N points, where N is a positive integer, and a message key as a secret. See operation 106. Shamir's polynomial-based secret sharing scheme refers to an algorithm in cryptography created by Adi Shamir, where a secret is divided into parts, giving each participant its own unique part. To reconstruct the original secret, a minimum number of parts is required. In the threshold scheme, this number is less than the total number of parts. Otherwise, all participants are needed to reconstruct the original secret.

The sender system divides the first negotiated noisy secret into a plurality of sub-keys. See operation 108. The sender system divides a second negotiated noisy secret into test blocks of a length equivalent to a length of a sub-key. See operation 110.

The sender system utilizes each of the plurality sub-keys for encrypting a corresponding test block along with one unique point of the secret polynomial. See operation 112. Moreover, the sender system sends all encrypted test blocks and corresponding encrypted points of the secret polynomial to the receiver system with the encrypted message. See operation 114. More information associated with sender system operations (e.g. more detail, optional operations, etc.) is provided in the context of FIGS. 3 and 4A-4B, etc.

The receiver system may utilize the second negotiated noisy secret for sub-key validity testing. The receiver system may find M noiseless sub-key candidates, by decrypting the encrypted test blocks and comparing the encrypted test blocks with corresponding test blocks obtained from the second negotiated noisy secret by the receiver system. Further, the receiver system may decrypt the N points of the secret polynomial with the M noiseless sub-key candidates.

The receiver system may convert the secret polynomial into the secret message key. The receiver system may eliminate false positives by testing the secret message key using a special hardcoded message authentication code (MAC). The receiver system may test the secret message key using a full encrypted message MAC. More information associated with receiver system operations (e.g. more detail, optional operations, etc.) may be found in the context of FIGS. 3 and 5A-5B, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
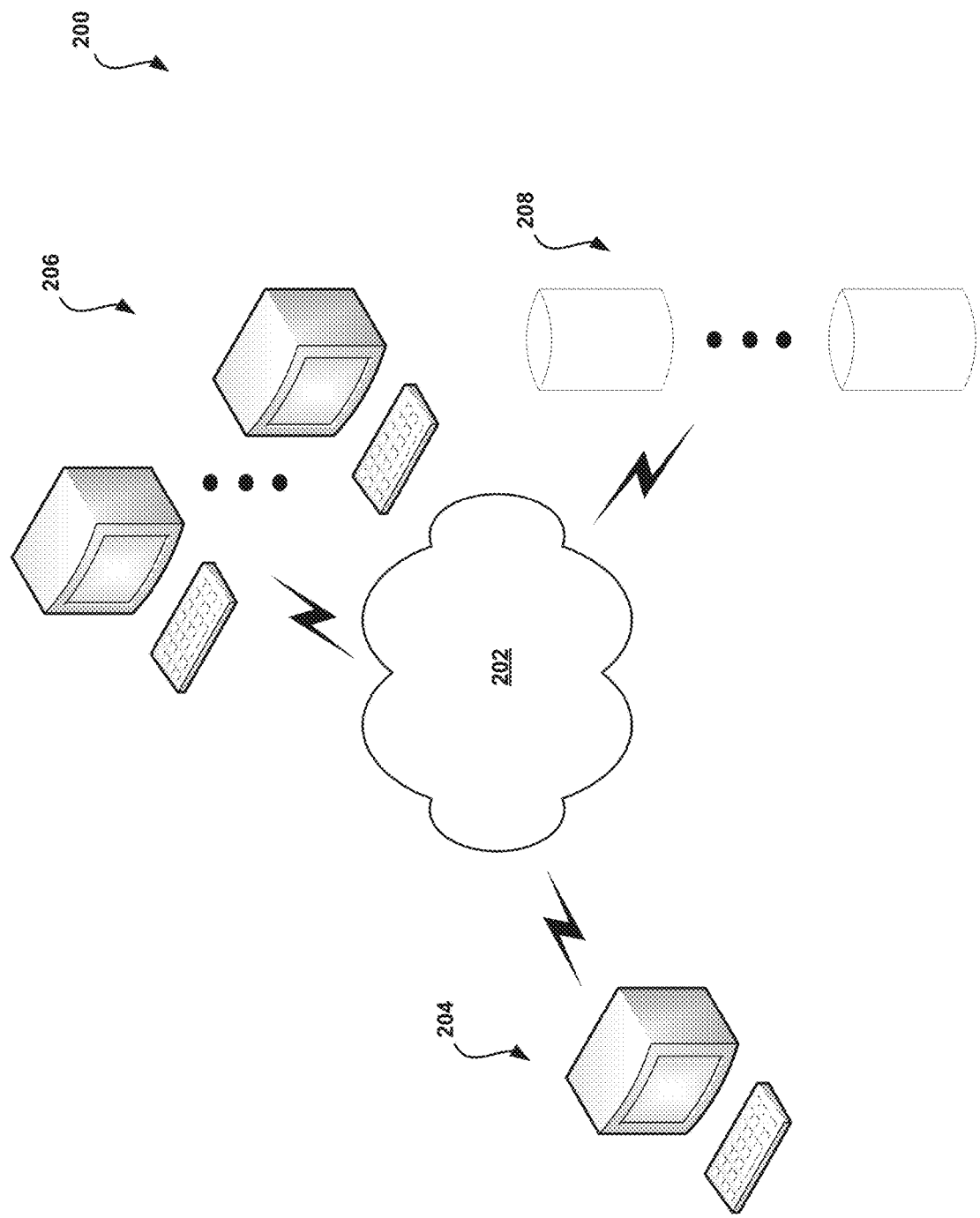
FIG. 2 shows a system for implementing zero round trip secure communications based on noisy secrets with a polynomial secret sharing scheme, in accordance with one embodiment.

FIG. 2 shows a system 200 for implementing zero round trip secure communications based on noisy secrets with a polynomial secret sharing scheme, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for ensuring secure communications based on noisy secrets with a polynomial secret sharing scheme. The system 204 may also be in communication with one or more repositories/databases 208.

Secure communication based on noisy negotiated secrets is possible even when the receiving party is not online to fix the noise. One way to do that is to use multiple sub-keys to encrypt the message key, and send the list of the encrypted message keys to the recipient along with actual encrypted message. The problem is that increasing key size increases the number of required sub-keys exponentially. One trivial solution to reduce the overhead is to increase the acceptable level of message loss, but it is not always practical.

The approach implemented by the system 200 allows systems to significantly reduce message overhead and the probability of message loss due to the secret noise.

Figure 3:
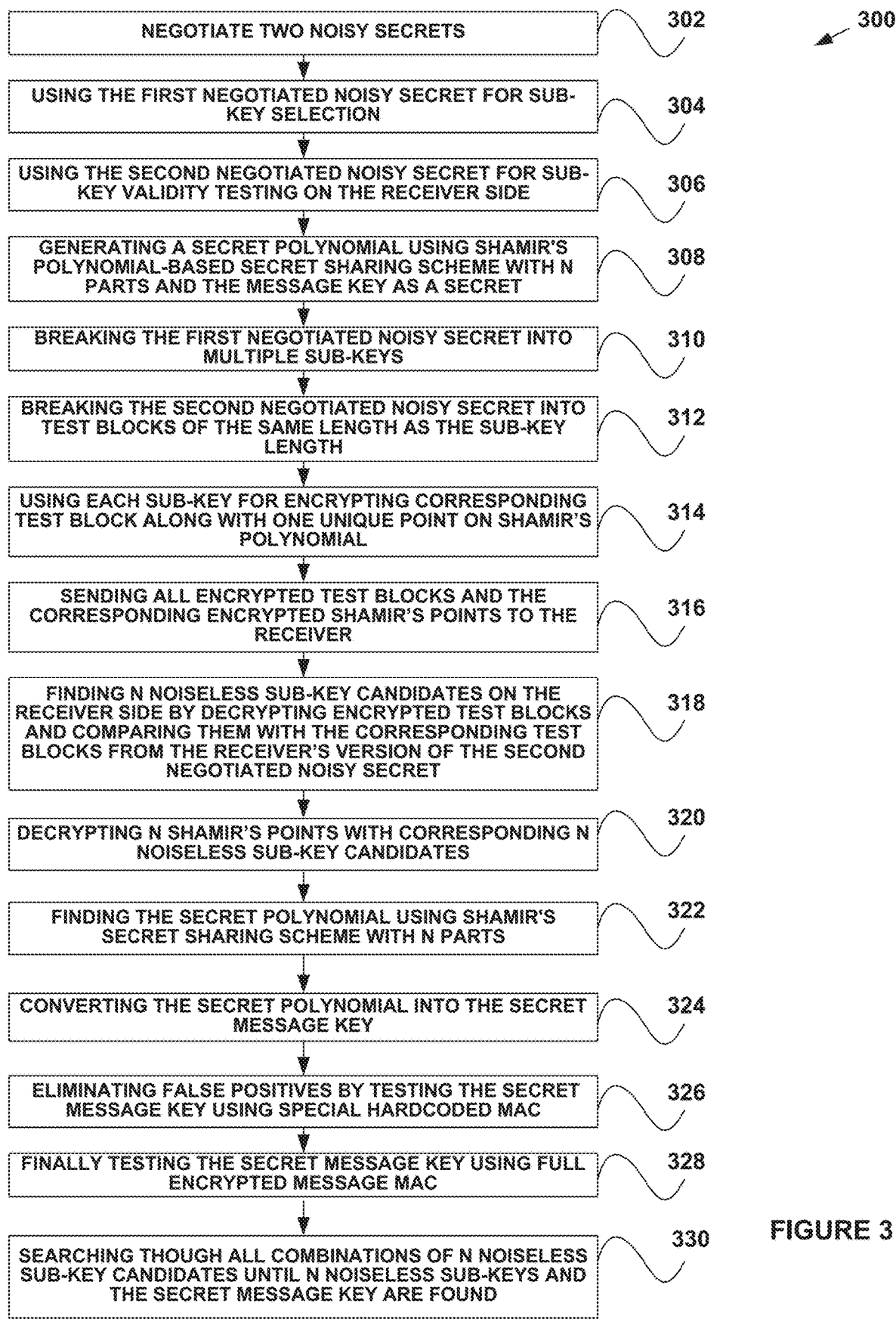
FIG. 3 shows a system flow diagram illustrating steps for implementing zero round trip secure communications based on noisy secrets with a polynomial secret sharing scheme, in accordance with another embodiment.

FIG. 3 shows a system flow diagram 300 illustrating steps for implementing zero round trip secure communications based on noisy secrets with a polynomial secret sharing scheme, in accordance with another embodiment. As an option, the system flow diagram 300 may be carried out in the context of any of the previously described figures. Of course, however, the system flow diagram 300 may be carried out in any desired context. It should also be noted that the aforementioned definitions may apply during the present description.

In operation, a sender system and a receiver system negotiate two negotiated noisy secrets. See operation 302. For example, the sender system may choose two ephemeral key pairs where each ephemeral key will provide a unique secret when used with the recipient's static asymmetric key. The first negotiated noisy secret is used for sub-key selection. See operation 304.

The second negotiated noisy secret is used for sub-key validity testing on the receiver side. See operation 306. A secret polynomial is generated using Shamir's polynomial-based secret sharing scheme with N parts and the message key as a secret. See operation 308. The number of parts depends on the message key length and the sub-key length.

The first negotiated noisy secret is broken into multiple sub-keys. See operation 310. The number of sub-keys and their length may vary depending on the negotiated secret length, the number of noisy bits, and the message key length.

The second negotiated noisy secret is broken into test blocks of the same length as the sub-key length. See operation 312. Each sub-key is used for encrypting a corresponding test block (from the second noisy secret) along with one unique point on Shamir's polynomial. See operation 314. The number of test blocks is equal to the number of sub-keys. Sub-key 1 would encrypt test block 1, sub-key 2 would encrypt test block 2, etc.

All encrypted test blocks and the corresponding encrypted Shamir's points are sent to the receiver system. See operation 316. N noiseless sub-key candidates are found on the receiver side by decrypting encrypted test blocks and comparing them with the corresponding test blocks from the receiver's version of the second negotiated noisy secret. See operation 318.

N Shamir's points are decrypted with corresponding N noiseless sub-key candidates. See operation 320. The secret polynomial is found using Shamir's secret sharing scheme with N parts. See operation 322.

The secret polynomial is converted into the secret message key. See operation 324. False positives are eliminated by testing the secret message key using a special hardcoded MAC. See operation 326.

The secret message key is finally tested using a full encrypted message MAC. See operation 328. All combinations of N noiseless sub-key candidates are searched until N noiseless sub-keys and the secret message key are found. See operation 330.

Shamir's secret sharing scheme with N parts and the message key as a secret produces a message key after N Shamir's points are decrypted by N found noiseless sub-keys. False positives are eliminated by verifying the MAC computed on random bytes chosen by the sender and then the encrypted message MAC (MAC computed on message ciphertext).

As one example, assume that a negotiated noisy secret size is 1024 bits. The number of noisy bits is 64 per negotiated noisy secret. The message key length is 128 bits. The sub-key and test block size is 16 bits. Each negotiated noisy secret is split into 64 blocks. Shamir's shared secret requires 8 128-bit parts.

In one example simulation (100,000,000 iterations), 64 16-bit sub-key and test block pairs with 64 noisy bits in each 1024-bit negotiated secrets produced the following results: the number of noiseless sub-key and noiseless test block pairs—minimum 0, maximum 21 out of 64, 57.8% probability to have 8 or more noiseless sub-keys; the number of noiseless sub-key and noiseless or 1-noisy-bit test block pairs—minimum 3, maximum 32 out of 64, 99.99% probability to have 8 or more noiseless sub-keys; the number of noiseless or 1-noisy-bit sub-key and noiseless test block pairs—minimum 12, maximum 38 out of 64, 100% probability to have 8 or more noiseless sub-keys; and the number of noiseless or 1-noisy-bit sub-key and noiseless or 1-noisybit test block pairs—minimum 19, maximum 48 out of 64, 100% probability to have 8 or more noiseless sub-keys.

Even though the simulation shows that 8 noiseless sub-keys are available practically in 100% cases, the decryption procedure may still fail if too many false positive sub-keys are found, which may lead to a number of iterations exceeding a limit. Note that the maximum number of 8 sub-key combination out of 64 is 4,426,165,368.

Figure 4A:
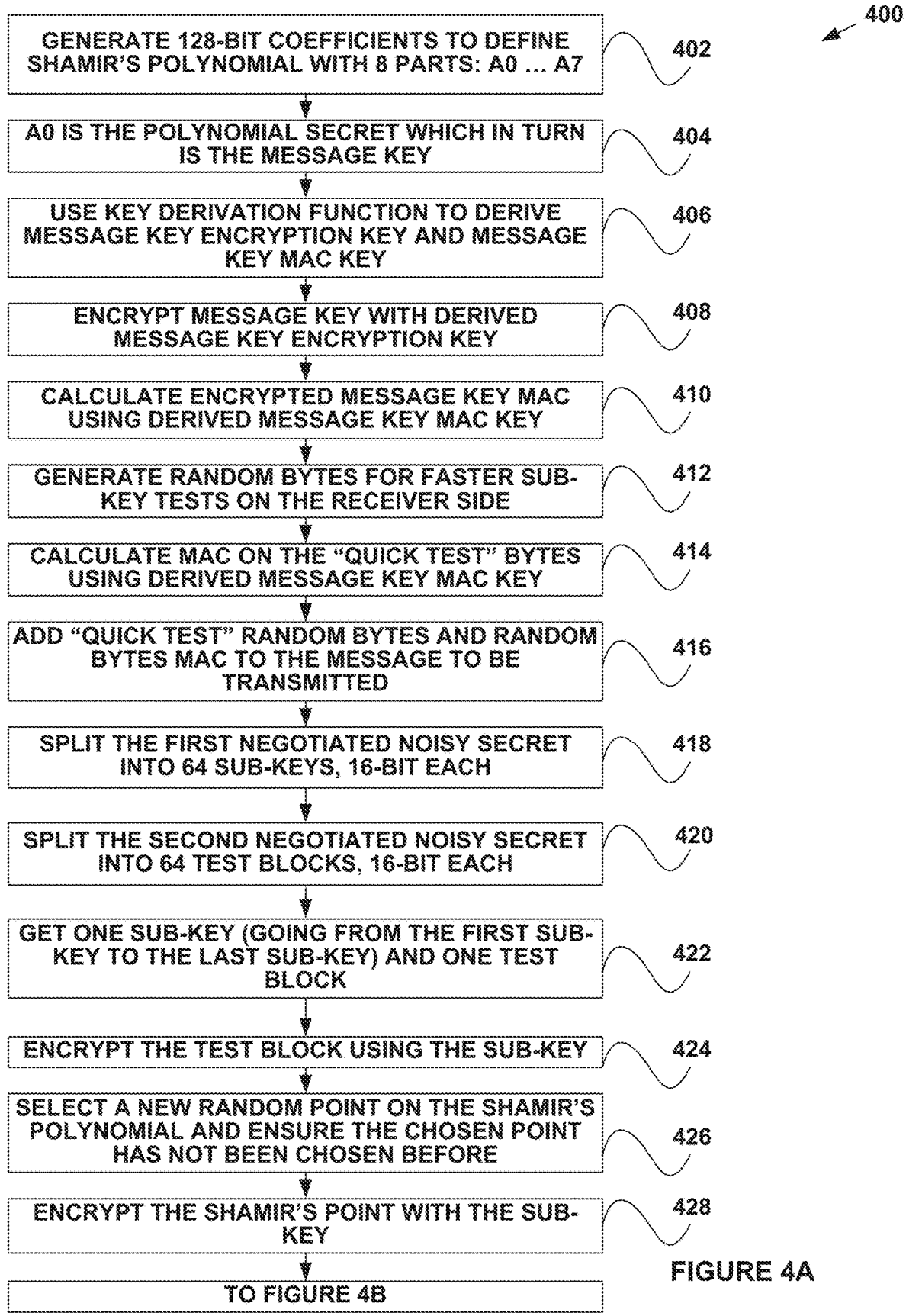
FIGS. 4A-4B show a system flow diagram illustrating steps for a sender system implementing zero round trip secure communications based on noisy secrets with a polynomial secret sharing scheme, in accordance with another embodiment.
Figure 4B:
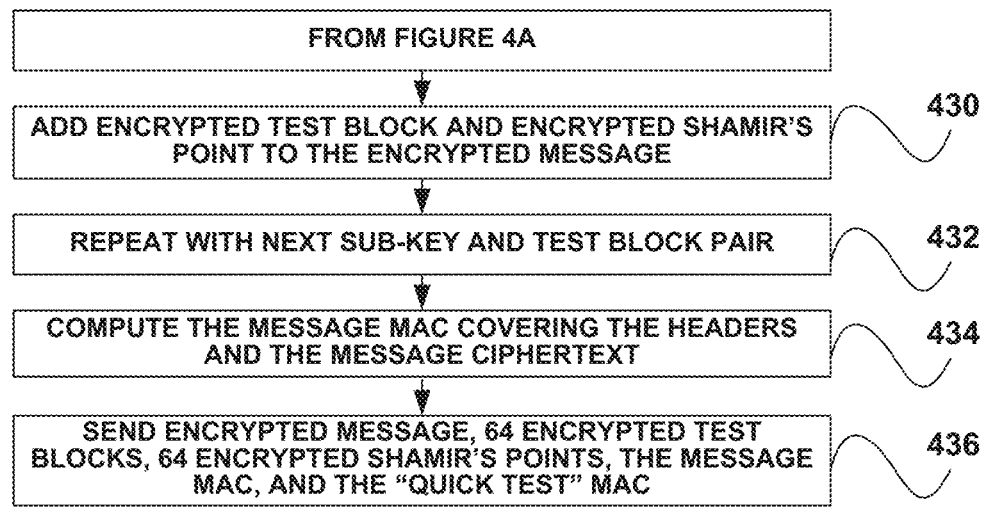

FIGS. 4A-4B show a system flow diagram 400 illustrating steps for a sender system implementing zero round trip secure communications based on noisy secrets with a polynomial secret sharing scheme, in accordance with another embodiment. As an option, the system flow diagram 400 may be carried out in the context of any of the previously described figures. Of course, however, the system flow diagram 400 may be carried out in any desired context. It should also be noted that the aforementioned definitions may apply during the present description.

In operation, a sender system generates 128-bit coefficients to define Shamir's polynomial with 8 parts: A0 . . . A7. See operation 402. The sender system uses A0 as the polynomial secret, which in turn is the message key. See operation 404.

The sender system uses a key derivation function to derive message key encryption key and message key MAC key. See operation 406. The sender system encrypts the message key with the derived message key encryption key. See operation 408.

The sender system calculates an encrypted message key MAC using the derived message key MAC key. See operation 410. The sender system generates random bytes for faster sub-key tests on the receiver side. See operation 412. The "quick test" MAC will be computed on the random bytes to enable quick sub-key verification on the receiver side.

The sender system calculates a MAC on the "quick test" bytes using the derived message key MAC key. See operation 414. The sender system adds "quick test" random bytes and random bytes MAC to the message to be transmitted. See operation 416.

The sender system splits the first negotiated noisy secret into 64 sub-keys, 16-bit each. See operation 418. The sender system splits the second negotiated noisy secret into 64 test blocks, 16-bit each. See operation 420.

The sender system obtains one sub-key (going from the first sub-key to the last sub-key) and one test block. See operation 422. The sender system encrypts the test block using the sub-key. See operation 424.

The sender system selects a new random point on the Shamir's polynomial and ensures the chosen point has not been chosen before. See operation 426. The sender system encrypts the Shamir's point with the sub-key. See operation 428.

As shown in FIG. 4B, the sender system adds the encrypted test block and encrypted Shamir's point to the encrypted message. See operation 430. The sender system repeats operations 422-430 with the next sub-key and test block pair. See operation 432.

The sender system computes the message MAC covering the headers and the message ciphertext. See operation 434. The sender system sends the encrypted message, 64 encrypted test blocks, 64 encrypted Shamir's points, the message MAC, and the "quick test" MAC. See operation 436.

The sub-key message data={IV, encrypted test block, IV, encrypted Shamir's point}. The message format={encrypted message, encrypted message MAC, "quick test" bytes, "quick test" MAC, array of sub-key message data}.

Figure 5A:
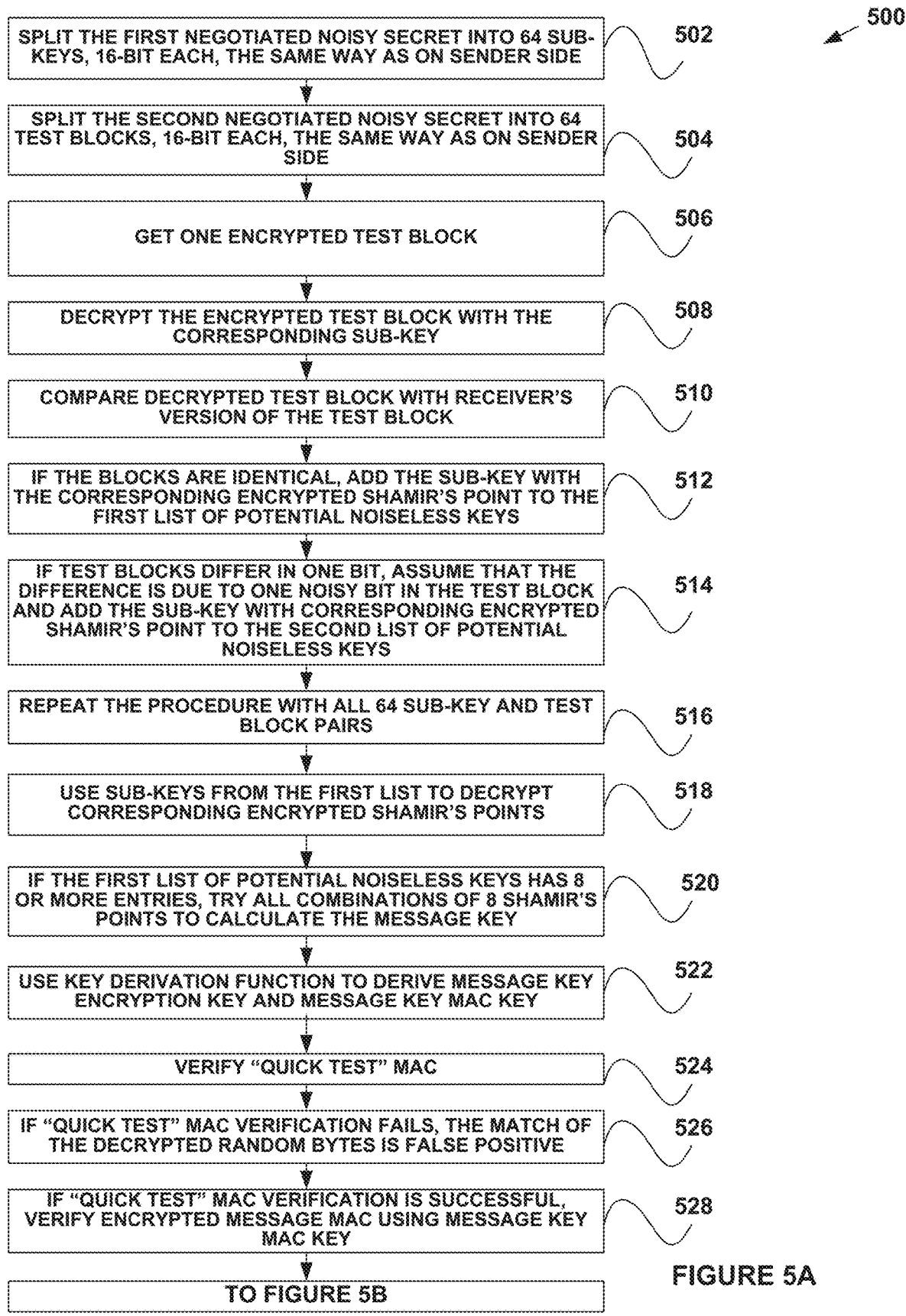
FIGS. 5A-5B show a system flow diagram illustrating steps for a receiver system implementing zero round trip secure communications based on noisy secrets with a polynomial secret sharing scheme, in accordance with another embodiment.
Figure 5B:
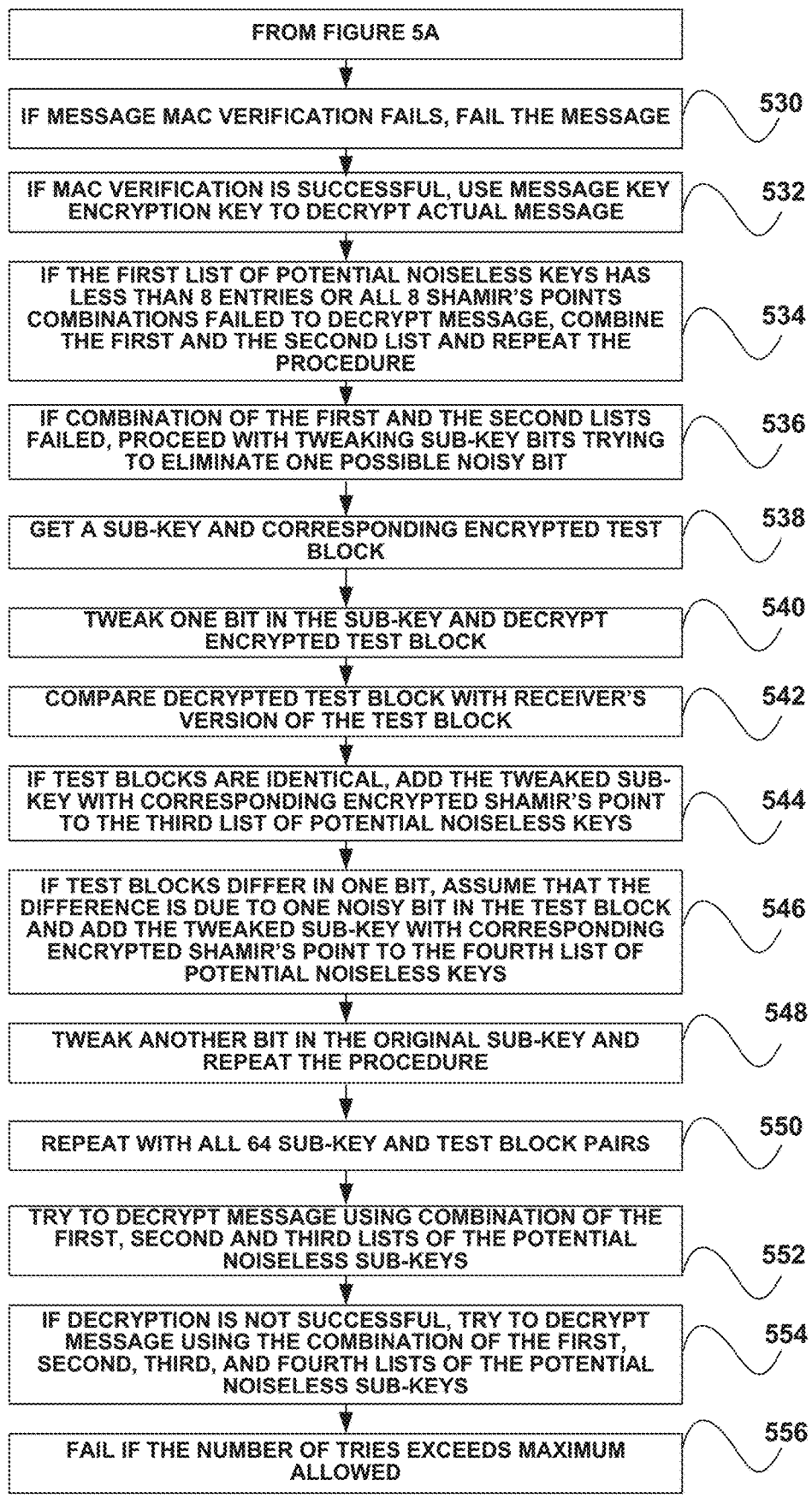

FIGS. 5A-5B show a system flow diagram 500 illustrating steps for a receiver system implementing zero round trip secure communications based on noisy secrets with a polynomial secret sharing scheme, in accordance with another embodiment. As an option, the system flow diagram 500 may be carried out in the context of any of the previously described figures. Of course, however, the system flow diagram 500 may be carried out in any desired context. It should also be noted that the aforementioned definitions may apply during the present description.

In operation, the receiver system splits the first negotiated noisy secret into 64 sub-keys, 16-bit each, the same way as the sender system. See operation 502. The receiver system splits the second negotiated noisy secret into 64 test blocks, 16-bit each, the same way as the sender system. See operation 504.

The receiver system obtains one encrypted test block. See operation 506. The receiver system chooses the first block first, then the second block, and so on. The receiver system decrypts the encrypted test block with the corresponding sub-key. See operation 508.

The receiver system compares the decrypted test block with receiver's version of the test block. See operation 510. If the blocks are identical, the receiver system adds the sub-key with the corresponding encrypted Shamir's point to the first list of potential noiseless keys. See operation 512.

If test blocks differ in one bit, the receiver system assumes that the difference is due to one noisy bit in the test block and adds the sub-key with a corresponding encrypted Shamir's point to the second list of potential noiseless keys. See operation 514. The receiver system repeats operations 506-514 with all 64 sub-key and test block pairs. See operation 516.

The receiver system uses sub-keys from the first list to decrypt corresponding encrypted Shamir's points. See operation 518. If the first list of potential noiseless keys has 8 or more entries, the receiver system tries all combinations of 8 Shamir's points to calculate the message key. See operation 520.

The receiver system uses a key derivation function to derive message key encryption key and message key MAC key. See operation 522. The receiver system verifies the "quick test" MAC. See operation 524. If the "quick test" MAC verification fails, the receiver system determines that the match of the decrypted random bytes is a false positive and proceeds with the next combination of 8 Shamir's points. See operation 526.

If the "quick test" MAC verification is successful, the receiver system verifies the encrypted message MAC using the message key MAC key. See operation 528. As shown in FIG. 5B, if the message MAC verification fails, the receiver system fails the message. See operation 530. In this case, there was most likely an attack on the message.

If the MAC verification is successful, the receiver system uses the message key encryption key to decrypt the actual message. See operation 532. At this point the decryption is complete. If the first list of potential noiseless keys has less than 8 entries or all 8 Shamir's point combinations failed to decrypt the message, the receiver system combines the first and the second lists and repeats the procedure. See operation 534.

If the combination of the first and the second lists failed, the receiver system proceeds with tweaking sub-key bits trying to eliminate one possible noisy bit. See operation 536.

The receiver system obtains a sub-key and corresponding encrypted test block. See operation 538.

The receiver system tweaks one bit in the sub-key and decrypts the encrypted test block. See operation 540. The receiver system compares the decrypted test block with the receiver's version of the test block. See operation 542.

If the test blocks are identical, the receiver system adds the tweaked sub-key with a corresponding encrypted Shamir's point to the third list of potential noiseless keys. See operation 544. If the test blocks differ in one bit, the receiver system assumes that the difference is due to one noisy bit in the test block and adds the tweaked sub-key with a corresponding encrypted Shamir's point to the fourth list of potential noiseless keys. See operation 546.

The receiver system tweaks (i.e. adjusts) another bit in the original sub-key and repeats operation 546. See operation 548. The receiver system repeats operation 548 with all 64 sub-key and test block pairs. See operation 550.

The sender system tries to decrypt the message using a combination of the first, second, and third lists of the potential noiseless sub-keys. See operation 552. If decryption is not successful, the sender system tries to decrypt the message using the combination of the first, second, third, and fourth lists of the potential noiseless sub-keys. See operation 554. The sender system fails the message if the number of tries exceeds the maximum allowed tries. See operation 556.

More information associated with adjusting bits in noisy sub-keys may be found in U.S. patent application Ser. No. 16/352,515, titled "SYSTEM, METHOD, AND COMPUTER PROGRAM PRODUCT FOR ZERO ROUND TRIP SECURE COMMUNICATIONS BASED ON A NOISY SECRET WITH A REDUCED MESSAGE SIZE," which is incorporated herein by reference.

As an example of message size overhead due to per sub-key data sent: there are 64 sub-key and test block pairs; each sub-key requires extra information to be sent, such as encrypted Shamir's point (128 bits), and encrypted test blocks (128 bits), where overhead is 256 bits or 32 bytes per sub-key. For all 64 sub-keys, the overhead is 64*32=2 Kbytes.

The receiver system has to decrypt 64 test blocks and 64 Shamir's points with corresponding sub-keys first, and if the message key is not found, decrypt the same 64 test blocks and 64 Shamir's points trying 16 tweaked variations of each sub-key. This makes 64*16=1024 extra decryptions.

Figure 6:
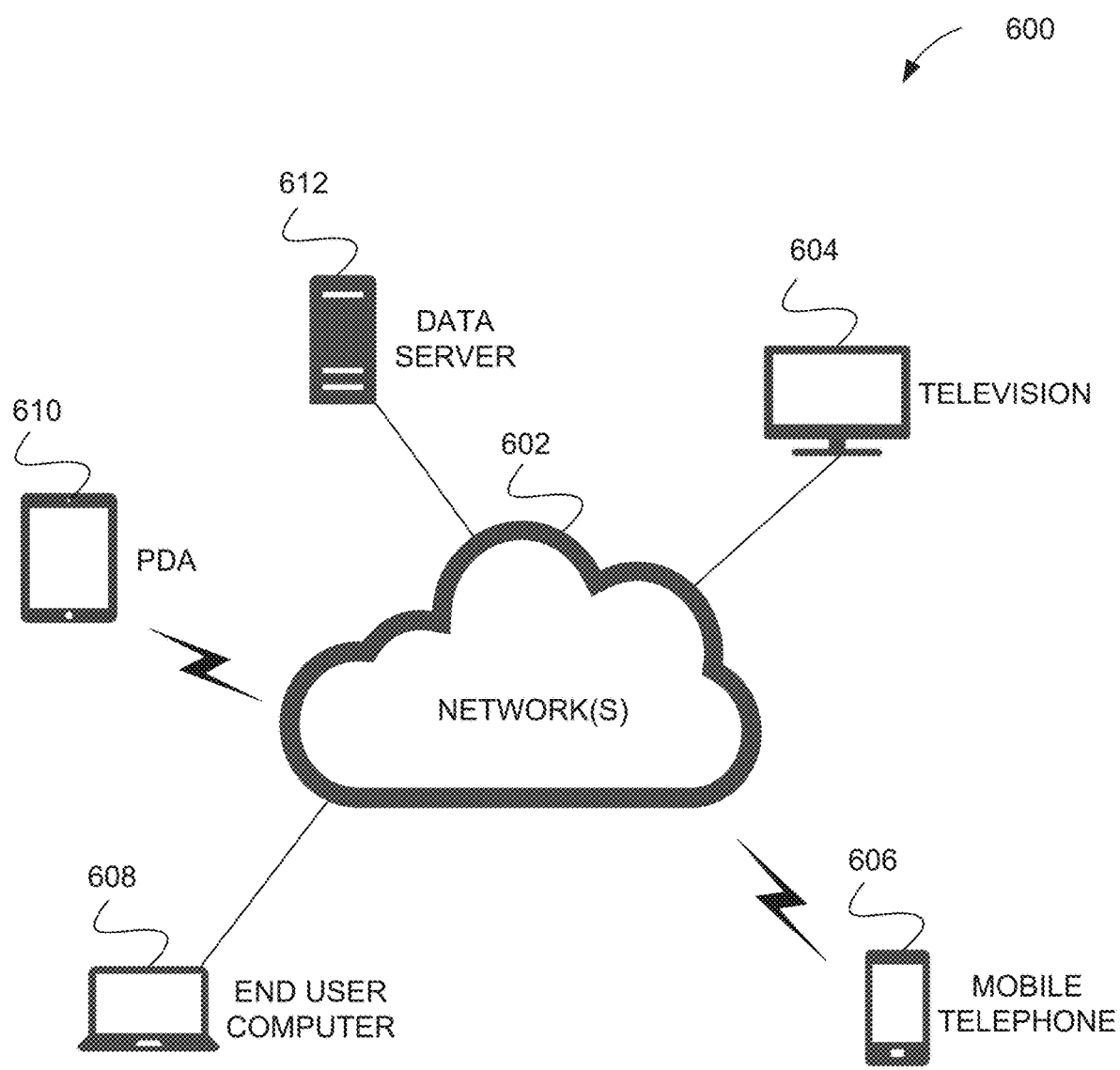
FIG. 6 illustrates a network architecture, in accordance with one embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
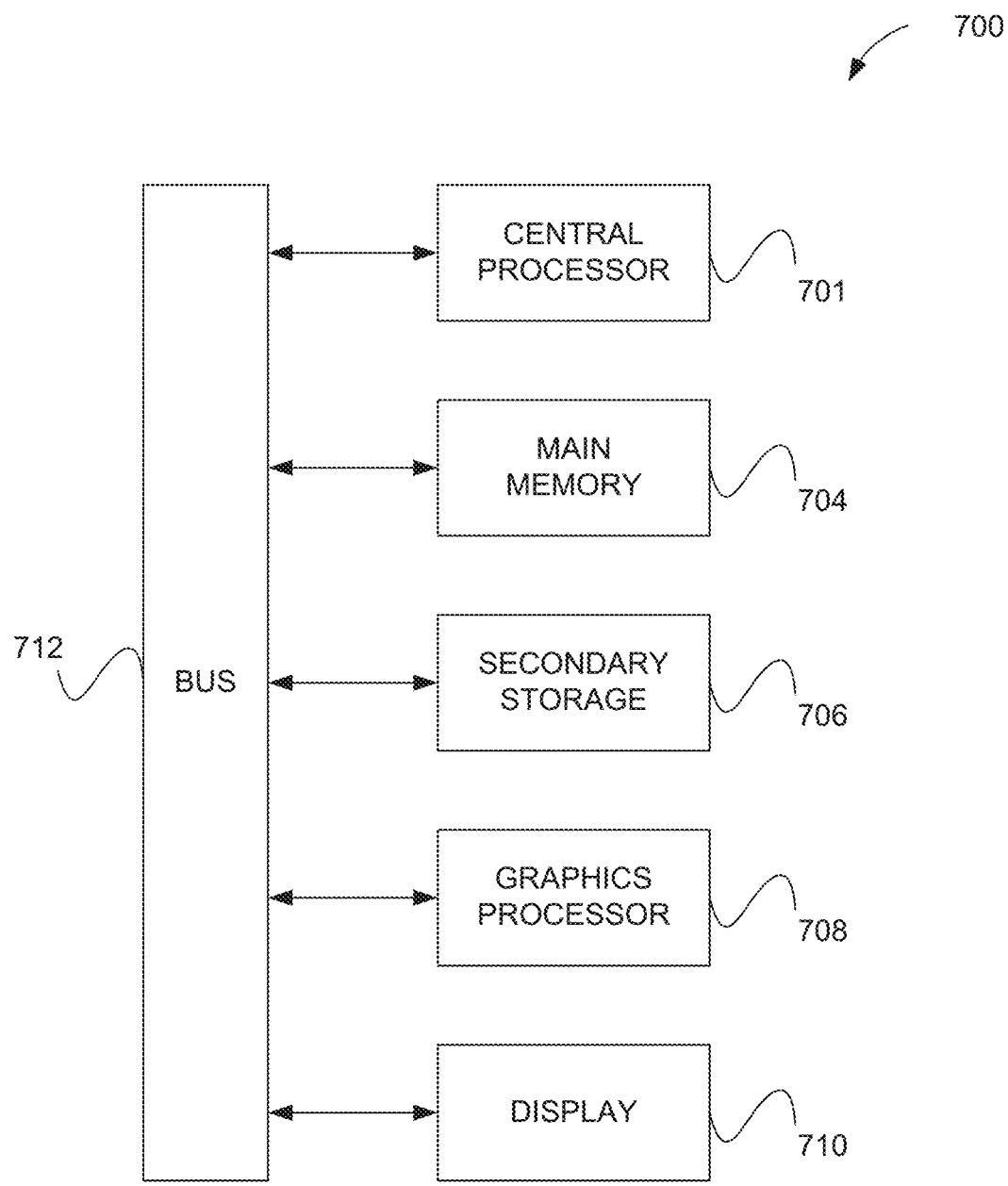
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

In one embodiment, means in the form of the processor 702 (and/or different means corresponding to different components thereof) executes instructions in the memory 704 or in the secondary storage 706 for: identifying, by a sender system, two negotiated noisy secrets associated with an encrypted message to send to a receiver system; utilizing, by the sender system, a first negotiated noisy secret for sub-key selection; generating, by the sender system, a secret polynomial using Shamir's polynomial-based secret sharing scheme with N points, where N is a positive integer, and a message key as a secret; dividing, by the sender system, the first negotiated noisy secret into a plurality of sub-keys; dividing, by the sender system, a second negotiated noisy secret into test blocks of a length equivalent to a length of a sub-key; utilizing, by the sender system, each of the plurality sub-keys for encrypting a corresponding test block along with one unique point of the secret polynomial; and sending, by the sender system, all encrypted test blocks and corresponding encrypted points of the secret polynomial to the receiver system with the encrypted message.

In another embodiment, means in the form of the processor 702 (and/or different means corresponding to different components thereof) executes instructions in the memory 704 or in the secondary storage 706 to: utilize; the second negotiated noisy secret for sub-key validity testing; find M noiseless sub-key candidates, where M is a positive integer, by decrypting the encrypted test blocks and comparing the encrypted test blocks with corresponding test blocks obtained from the second negotiated noisy secret by the receiver system; decrypt the N points of the secret polynomial with the M noiseless sub-key candidates. Convert the secret polynomial into the secret message key; eliminate false positives by testing the secret message key using a special hardcoded message authentication code (MAC); and test the secret message key using a full encrypted message MAC.

In various other embodiments, means in the form of the processor 702 (and/or different means corresponding to different components thereof) executes instructions in the memory 704 or in the secondary storage 706 to implement the operations shown and described in the context of FIGS. 3 through 5B.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
identifying, by a sender device, two negotiated noisy secrets associated with an encrypted message to send to a receiver device;
utilizing, by the sender device, a first negotiated noisy secret for sub-key selection;
generating, by the sender device, a secret polynomial using Shamir's polynomial-based secret sharing scheme with N points, where N is a positive integer, and a message key as a secret;
dividing, by the sender device, the first negotiated noisy secret into a plurality of sub-keys;
dividing, by the sender device, a second negotiated noisy secret into test blocks of a length equivalent to a length of a sub-key;
utilizing, by the sender device, each of the plurality sub-keys for encrypting a corresponding test block along with one unique point of the secret polynomial; and
sending, by the sender device, all encrypted test blocks and corresponding encrypted points of the secret polynomial to the receiver device with the encrypted message;
wherein the receiver device utilizes the second negotiated noisy secret for sub-key validity testing;
wherein the receiver device finds M noiseless sub-key candidates, where M is a positive integer, by decrypting the encrypted test blocks and comparing the encrypted test blocks with corresponding test blocks obtained from the second negotiated noisy secret by the receiver device.

2. The method of claim 1, wherein the receiver device decrypts the N points of the secret polynomial with the M noiseless sub-key candidates.

3. The method of claim 2, wherein the receiver device converts the secret polynomial into the secret message key.

4. The method of claim 3, wherein the receiver device eliminates false positives by testing the secret message key using a special hardcoded message authentication code (MAC).

5. The method of claim 4, wherein the receiver device tests the secret message key using a full encrypted message MAC.

6. A non-transitory computer readable medium storing computer code executable by a processor to perform a method comprising:
identifying, by a sender device, two negotiated noisy secrets associated with an encrypted message to send to a receiver device;
utilizing, by the sender device, a first negotiated noisy secret for sub-key selection;
generating, by the sender device, a secret polynomial using Shamir's polynomial-based secret sharing scheme with N points, where N is a positive integer, and a message key as a secret;
dividing, by the sender device, the first negotiated noisy secret into a plurality of sub-keys;
dividing, by the sender device, a second negotiated noisy secret into test blocks of a length equivalent to a length of a sub-key;
utilizing, by the sender device, each of the plurality sub-keys for encrypting a corresponding test block along with one unique point of the secret polynomial; and
sending, by the sender device, all encrypted test blocks and corresponding encrypted points of the secret polynomial to the receiver device with the encrypted message;
wherein the receiver device utilizes the second negotiated noisy secret for sub-key validity testing;
wherein the receiver device finds M noiseless sub-key candidates, where M is a positive integer, by decrypting the encrypted test blocks and comparing the encrypted test blocks with corresponding test blocks obtained from the second negotiated noisy secret by the receiver device.

7. The non-transitory computer readable medium of claim 6, wherein the receiver device decrypts the N points of the secret polynomial with the M noiseless sub-key candidates.

8. The non-transitory computer readable medium of claim 7, wherein the receiver device converts the secret polynomial into the secret message key.

9. The non-transitory computer readable medium of claim 8, wherein the receiver device eliminates false positives by testing the secret message key using a special hardcoded message authentication code (MAC).

10. The non-transitory computer readable medium of claim 9, wherein the receiver device tests the secret message key using a full encrypted message MAC.

11. A sender device, comprising:
a memory storing instructions, and
a computer processor executing the instructions for:
identifying two negotiated noisy secrets associated with an encrypted message to send to a receiver device;
utilizing a first negotiated noisy secret for sub-key selection;
generating a secret polynomial using Shamir's polynomial-based secret sharing scheme with N points, where N is a positive integer, and a message key as a secret;
dividing the first negotiated noisy secret into a plurality of sub-keys;
dividing a second negotiated noisy secret into test blocks of a length equivalent to a length of a sub-key;
utilizing each of the plurality sub-keys for encrypting a corresponding test block along with one unique point of the secret polynomial; and
sending all encrypted test blocks and corresponding encrypted points of the secret polynomial to the receiver device with the encrypted message;
wherein the receiver device utilizes the second negotiated noisy secret for sub-key validity testing;
wherein the receiver device finds M noiseless sub-key candidates, where M is a positive integer, by decrypting the encrypted test blocks and comparing the encrypted test blocks with corresponding test blocks obtained from the second negotiated noisy secret by the receiver device.

12. The sender device of claim 11, wherein the receiver device decrypts the N points of the secret polynomial with the M noiseless sub-key candidates.

13. The sender device of claim 12, wherein the receiver device converts the secret polynomial into the secret message key.

14. The sender device of claim 13, wherein the receiver device eliminates false positives by testing the secret message key using a special hardcoded message authentication code (MAC).

* * * * *